Figure 1:
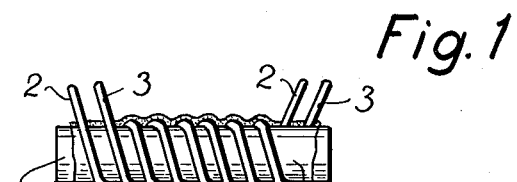

United States Patent Office 3,056,935
Patented Oct. 2, 1962

3,056,935
FEELER ELEMENT FOR A HUMIDOSTAT
Jens E. G. Jensen, Nordborg, Als, Denmark, assignor to Danfoss ved ingenior Mads Clausen, Elsmmark, Denmark, a Danish firm
Filed Sept. 16, 1960, Ser. No. 56,486
Claims priority, application Denmark Sept. 21, 1959
4 Claims. (Cl. 338—35)

The invention relates to a feeler element for a humidostat of the kind in which an electric current is passed through a feeler element and in which the variation of the electric conductivity of the said element as a function of the relative humidity of a gas surrounding the feeler element is measured or indicated by means of the electric members of the humidostat, the element being provided with a hygroscopic polymeric layer of material the water absorption of which is reversibly dependent on the relative humidity of the surrounding gas.

Feeler elements of the aforesaid kind are known, but they have the drawback that their characteristic of humidity and resistance is very unfavourable, their high ohmic resistance varying according to a declining exponential function over several powers of ten when the relative humidity of the gas surrounding the feeler element varies from 10 to 90%. To overcome this drawback of the known feeler elements use is made of a method of comparative measurement in the humidostat connected to the feeler element, in which the said feeler element exposed to the variable humidity is incorporated e.g. in one bridge arm of a bridge arrangement, a corresponding feeler element being inserted in the other bridge arm and exposed to a constant and predetermined relative humidity. Such a measurement method requires, however, very sensitive measuring or indicating instruments and is therefore suitable for scientific rather than for technical purposes.

It is the object of the present invention to devise a feeler element of the aforesaid kind which with reasonable dimensions of the feeler element has a variable electric resistance of such order that the feeler element can be used in a low ohmic or low impedance circuit.

An essential feature of a feeler element according to the invention is that the polymeric material is polyvinyl alcohol to which is added a readily soluble inorganic salt such as ammonium chloride.

As experience by tests has shown, the result obtained is a low ohmic or low impedance feeler element which is durable and even in the long run shows an unequivocal reversible variation of the conductivity in relation to the relative humidity of the surrounding gas. A further result obtained is that the conductivity of the element can be adapted to the electric circuits and the electric indicating instruments used, just as the feeler element can be adapted to the humidity range to be measured or indicated.

In another embodiment of the feeler element according to the invention binding agents and fillers such as boric acid and borax are added to the polymeric material, as a result of which the polymeric layer of material can be produced in suitable thickness and with sufficient adhesion to be applied to the electrodes of the feeler in durable manner.

In still another embodiment of the feeler element according to the invention the polymeric layer of material is applied to the surface of a plane or cylindrical body prior to or after a couple of electrodes having been mounted on the said surface. As a result, the feeler element constitutes a robust and durable unity.

In a suitable embodiment of the feeler element the electrodes consist of two corrosion-resistant metal wires such as wires of a precious metal, extending parallelly along the surface of the body, but alternatively the electrodes may according to the invention consist of two comb-shaped metal coatings of corrosion-resistant material such as foils of precious metal in which the teeth of one electrode enter into the spaces between the teeth of the other electrode.

Figure 2:
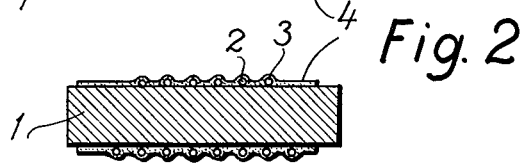
Figure 3:
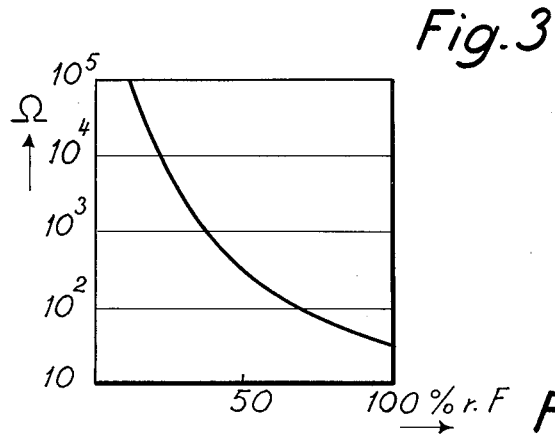
Figure 4:
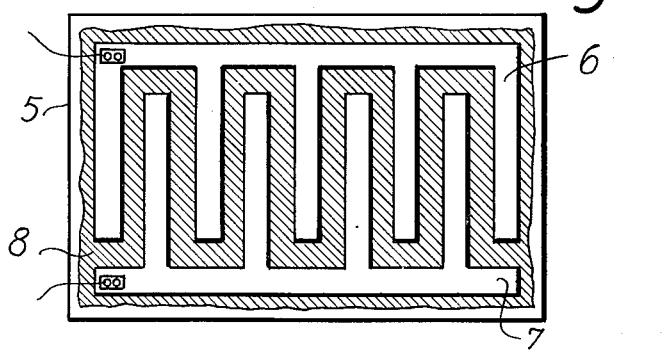

The invention will now be described in further detail with reference to the drawing, in which FIGURE 1 is a schematic representation of an embodiment of a feeler element according to the invention, viewed from the side, FIGURE 2 is the same, viewed on a diametral longitudinal section, FIGURE 3 is an example of a characteristic curve of the resistance variation of the feeler element, shown as a function of the relative humidity, and FIGURE 4 is another embodiment of a feeler element according to the invention.

In the drawing, 1 denotes a body of an electrically insulating, non-hygroscopic material around which body there are provided two electrodes 2 and 3 which may consist of windings of parallelly extending, electrically conducting thin wires, as shown in FIGURES 1 and 2. The wires 2 and 3 are made of corrosion-resistant material, preferably a precious metal. The body 1 is in known manner provided with a relatively thin layer 4 of material which is moisture absorbent and forms a conducting surface layer between the wires 2, 3 which are connected to an electric measuring or indicating circuit (not shown) in which the wires 2, 3 constitute electrodes between which the measuring or indicating circuit measures or indicates variations in the conductivity of the surface layer, more particularly the variation in the conductivity in relation to the relative humidity of a gas surrounding the feeler. The surface layer 4 consists of a hygroscopic polymeric material the water absorption of which is reversibly dependent on the relative humidity of the gas surrounding the feeler. A very suitable material used according to the invention is polyvinyl alcohol to which is added a readily soluble inorganic salt such as ammonium chloride and to which may be added binding agents and fillers such as boric acid and borax. FIGURE 3 shows by way of example a characteristic curve of the resistance variation of a feeler element made according to the invention as function of the relative humidity of the surrounding air. As will be seen from the graph the feeler element is of low impedance, the impedance of the element in the humidity range from 50 to abt. 90% relative humidity varying from abt. 500 to abt. 50 ohm, as a result of which the feeler element can be used in connection with a low impedance measuring or indicating circuit which is relatively insensitive to electrically indicated noise voltages and therefore may be used without any substantial screening.

FIGURE 4 shows another embodiment of the feeler element according to the invention in which a plane or cylindrical body 5 of electric non-hygroscopic material is provided with comb-like electrodes 6 and 7 on its surface, of which the teeth of one electrode enter the spaces between the teeth of the other electrode, the moisture absorbent material layer 8 being applied to the surface of the said body prior to or after the electrodes 6 and 7 being mounted.

What I claim and desire to secure by Letters Patent is:
1. An improved feeler element for a humidostat comprising: an electrically nonconducting body; two corrosion-resistant electrodes mounted and extending on said body, said electrodes being spaced evenly apart for the extent of the mounting on said body; a layer of a combination of polyvinyl alcohol and ammonium chloride, having a low electrical resistance and a moisture sorption reversibly dependent on the relative humidity there- around, applied to said body intermediate and around said electrodes whereby the impedance of said feeler element varies inversely with the humidity range therearound.

2. A feeler element as described in claim 1, wherein binding and filling means comprising boric acid and borax are added to said polymeric material for binding said polymeric material to said body and electrodes when applied thereon.

3. A feeler element as claimed in claim 1, characterised in that the electrodes comprise two corrosion-resistant metal wires of a precious metal, extending parallelly along the surface of the body.

4. A feeler element as claimed in claim 1, characterised in that the electrodes consist of two comb-shaped metal coatings of corrosion resistant material such as foils of precious metal, the teeth of one electrode entering the spaces between the teeth of the other electrode.

References Cited in the file of this patent
UNITED STATES PATENTS

| | | |
|---|---|---|
| 1,648,197 | Roodhouse | Nov. 8, 1927 |
| 2,937,524 | Gregor | May 24, 1960 |